United States Patent [19]

Ueyama

[11] Patent Number: 4,776,026
[45] Date of Patent: Oct. 4, 1988

[54] APPARATUS FOR ROTATING A DOT MATRIX PATTERN BY 90 DEGREES

[75] Inventor: Shuziro Ueyama, Tokyo, Japan
[73] Assignee: NEC Corporation, Tokyo, Japan
[21] Appl. No.: 121,832
[22] Filed: Nov. 17, 1987
[30] Foreign Application Priority Data Nov. 17, 1986 [JP] Japan .................................. 61-271983

[51] Int. Cl.⁴ .................................................. G06K 9/32
[52] U.S. Cl. ............................... 382/46; 340/727; 340/789; 358/280
[58] Field of Search ............... 340/727, 789; 382/46; 364/900 MS File; 358/280

[56] References Cited

FOREIGN PATENT DOCUMENTS 0137147 4/1985 European Pat. Off. ............... 382/46
0147441 12/1978 Japan .................................. 340/727
0207170 12/1983 Japan .................................. 382/46
0126769 7/1985 Japan .................................. 382/46

OTHER PUBLICATIONS

"Image Rotating System", IBM Technical Disclosure Bull., vol. 28, No. 7, Dec. 1985.

Primary Examiner—E. A. Goldberg
Assistant Examiner—Huan H. Tran
Attorney, Agent, or Firm—Sughrue, Mion, Zinn, Macpeak & Seas

[57] ABSTRACT

An improved circuit for rotating an n×n dot-matrix through 90° includes n latch circuits, each of which latches a column of the dot-matrix, and n output buffers, each of which is connected to the latch circuits susch that like-numbered bits of all matrix columns are forwarded to the same one output buffer.

5 Claims, 3 Drawing Sheets

FIG.3

| COLUMN ROW | 1 | 2 | 3 | 4 | 5 | 6 | 7 | 8 (BYTE) |
|---|---|---|---|---|---|---|---|---|
| 1 | D11 | D21 | D31 | D41 | D51 | D61 | D71 | D81 |
| 2 | D12 | D22 | D32 | D42 | D52 | D62 | D72 | D82 |
| 3 | D13 | D23 | D33 | D43 | D53 | D63 | D73 | D83 |
| 4 | D14 | D24 | D34 | D44 | D54 | D64 | D74 | D84 |
| 5 | D15 | D25 | D35 | D45 | D55 | D65 | D75 | D85 |
| 6 | D16 | D26 | D36 | D46 | D56 | D66 | D76 | D86 |
| 7 | D17 | D27 | D37 | D47 | D57 | D67 | D77 | D87 |
| 8 (BIT) | D18 | D28 | D38 | D48 | D58 | D68 | D78 | D88 |

FIG.4

| COLUMN ROW | 1 | 2 | 3 | 4 | 5 | 6 | 7 | 8 (BYTE) |
|---|---|---|---|---|---|---|---|---|
| 1 | D81 | D82 | D83 | D84 | D85 | D86 | D87 | D88 |
| 2 | D71 | D72 | D73 | D74 | D75 | D76 | D77 | D78 |
| 3 | D61 | D62 | D63 | D64 | D65 | D66 | D67 | D68 |
| 4 | D51 | D52 | D53 | D54 | D55 | D56 | D57 | D58 |
| 5 | D41 | D42 | D43 | D44 | D45 | D46 | D47 | D48 |
| 6 | D31 | D32 | D33 | D34 | D35 | D36 | D37 | D38 |
| 7 | D21 | D22 | D23 | D24 | D25 | D26 | D27 | D28 |
| 8 (BIT) | D11 | D12 | D13 | D14 | D15 | D16 | D17 | D18 |

APPARATUS FOR ROTATING A DOT MATRIX PATTERN BY 90 DEGREES

BACKGROUND OF THE INVENTION

The present invention relates to an apparatus for providing an n×n dot matrix pattern with the ability to rotate through 90 degrees.

Circuitry for rotating a dot matrix pattern through 90° (hereinafter referred to simply as "pattern rotating circuitry") is applied, for instance, to a dot matrix printer requiring rotation of its characters or numerals.

By the prior art, conversion of characters or numerals, each consisting of a dot matrix, from a horizontal to a vertical arrangement has been achieved by shifting the data of the dot matrix pattern bit by bit through a shift register.

The conventional pattern rotating circuit requires at least 8×8 bit shifting operations to rotate the pattern of an 8×8 dot matrix by 90°, and accordingly takes a long time to process such a rotation.

SUMMARY OF THE INVENTION

An object of the invention, therefore, is to provide a pattern rotating circuit which overcomes the above mentioned disadvantage and which is capable of processing the 90° rotation of a dot matrix pattern more quickly.

According to the invention, the apparatus for rotating an n×n dot matrix pattern by 90° comprises n latch circuits, each for latching one of the n-bit columns constituting the dot matrix pattern. The apparatus also comprises N output buffer circuits whose inputs are connected to the outputs of the n latch circuits so that each n-bit row constituting the dot matrix pattern can be outputted.

As this apparatus makes it possible to provide a 90° rotation of an n×n dot matrix pattern by latching bit columns into latch circuits and taking the columns out of the output buffer circuits, the present invention can help reduce substantially the length of time required for processing the rotation of a character.

BRIEF DESCRIPTION OF THE DRAWINGS

The above and other objects, features and advantages of the present invention will become apparent from the following detailed description when taken with the accompanying drawings in which:

FIGS. 3 and 4 are diagrams for describing the operation of the pattern rotating circuit.

DETAILED DESCRIPTION OF THE PREFERRED EMBODIMENT

Figure 1:
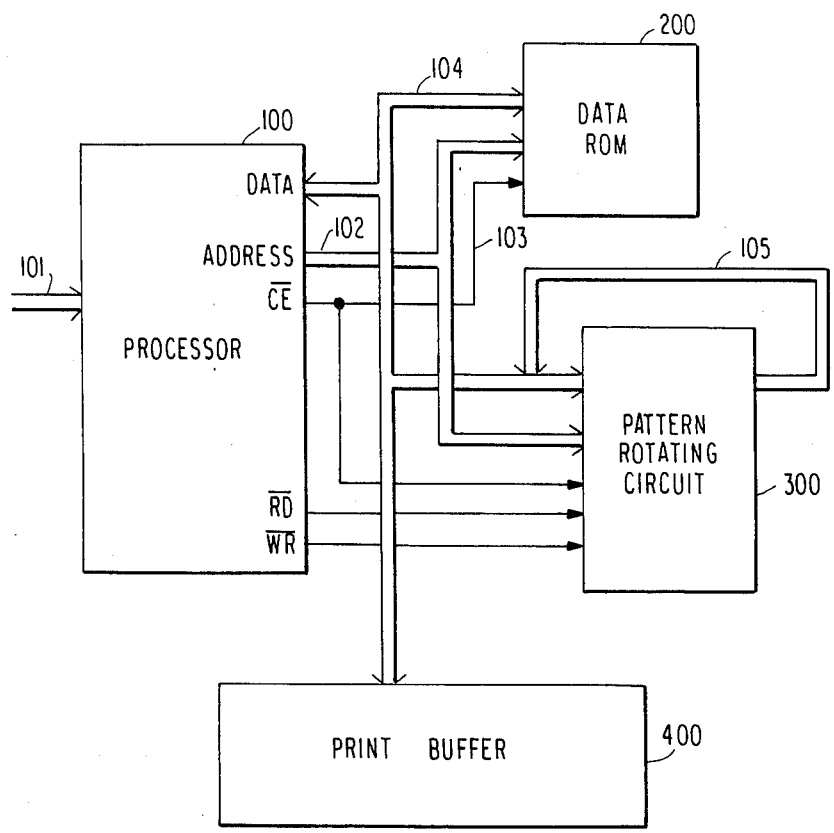
FIG. 1 is a block diagram illustrating a part of a dot matrix printer equipped with a pattern rotating circuit of the present invention.

A part of a dot matrix printer is shown in block diagram in FIG. 1 with a pattern rotating circuit 300 of the present invention. In FIG. 1, a processor (CPU) 100 is responsive to a pattern rotation instruction signal 101, externally supplied, to supply a memory selecting signal 103 to a memory 200. The CPU 100 also supplies an address signal by way of an address bus 102 to the memory 200. In response to the address and memory selecting signals, the memory 200 supplies character data in a dot matrix pattern to a pattern rotating circuit 300 by way of a data bus 104. The pattern rotating circuit 300, as will be described in more detail below, after taking in the character data in response to a write enable signal $\overline{WR}$ from the CPU 100, rotates the character data of the matrix pattern by 90°. The rotated data are supplied through an output bus 105 and the data bus 104 to a print buffer 400 in response to a read enable signal $\overline{RD}$ from the CPU 100.

Figure 2:
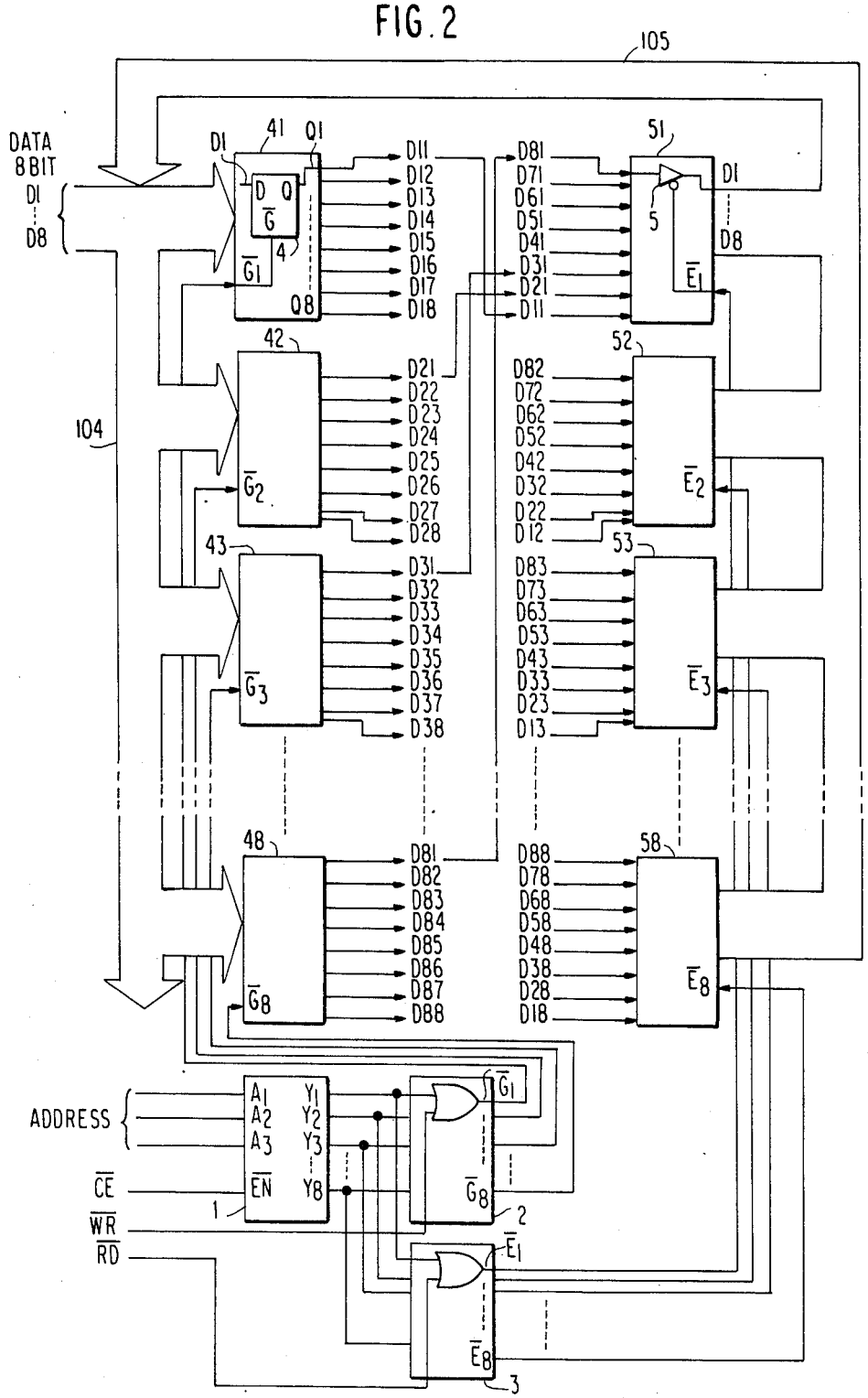
FIG. 2 is a circuit diagram illustrating a preferred embodiment of the present invention.

FIG. 2 is a circuit diagram illustrating a preferred embodiment of the present invention. In FIG. 2, the pattern rotating circuit 300 of the invention has eight latch circuits 41 to 48 for latching, in accordance with latch signals $\overline{G1}$ to $\overline{G8}$, the character data read out of the memory 200 (FIG. 1). Each character data consists, for instance as shown in FIG. 3, of a matrix of eight columns by eight rows. In this particular embodiment, the character data are supplied to the latch circuits 41 to 48 column by column. Each of the latch circuits 41 to 48, as is well known, is composed of eight D-type flip-flops (D-F/Fs) 4, one provided for each bit. The first bits D11, D21, D31, ... D81 of each of the columns (D11–D18 to D81–D88) are connected to an output buffer 51, and the second bits D12 to D82 of the same are connected to another output buffer 52. Similarly, the third to eighth bits of the columns, D13–D83 to D18–D88, are connected to the output buffers 53 to 58, respectively. The buffers 51 to 58 are responsive to buffer selection signals $\overline{E1}$ to $\overline{E8}$ to successively output 90° rotated character data D11–D81 to D18–D88 to the bus 105. The rotated character data, as shown in FIG. 4, are the result of a 90° rotation of the data shown in FIG. 3. The buffers 51 to 58 are composed of tristate gates 5, provided on a bit-by-bit basis.

A decoder 1 generates eight control signals Y1 to Y8, based on a three-bit (A1 to A3) address signal and a rotating circuit selecting signal $\overline{CE}$ from the CPU 100, and supplies them to gates 2 and 3. The gate 2 is responsive to the write enable signal $\overline{WR}$ from the CPU 100 and the control signals Y1 to Y8 to successively generate the latch signals $\overline{G1}$ to $\overline{G8}$. The gate 3, meanwhile, is responsive to the read enable signal $\overline{RD}$ from the CPU 100 and the control signals Y1 to Y8 to successively generate the buffer selecting signals $\overline{E1}$ to $\overline{E8}$. In FIG. 2, for the sake of simplicity of illustration, the connections between the first bits D11 to D81 of each column and the buffer 51 represent all other similar connections, which are not shown. Similarly, in FIG. 2, the tristate gate 5 and the D-F/F 4 are representatively illustrated in the buffer 51 and the latch circuit 41, but no other gates and F/Fs are shown.

What is claimed is:

1. An apparatus for rotating an n×n dot matrix pattern by 90 degrees, comprising:
    n latch means, each latching one n-bit column of said dot matrix pattern; and
    n output buffer means, each connected to an output of each of said n latch means, each outputting a set of n bits taken one from each column, said set of n bits constituting a column of an output dot matrix pattern rotated by 90 degrees with respect to said dot matrix pattern.

2. An apparatus as claimed in claim 1, wherein said n output buffer means are connected to the outputs of each of said latch means in a manner such that like-ordered bits of each of said columns are connected to the same one of said n output buffers.

3. An apparatus as claimed in claim 1, further comprising decoder means for receiving a plurality of address signals and for generating n control signals in response thereto; first gate means for receiving said n control signals and for generating n latch signals for said respective n latch means; and second gate means for receiving said n control signals and for successively generating n enable signals for said respective output buffer means.

4. An apparatus as claimed in claim 1, wherein each of said latch means includes n D-type flip-flops.

5. An apparatus as claimed in claim 1, wherein each of said output buffer means includes n tri-state gates.

* * * * *